Dec. 27, 1927.

D. PEPPER 1,653,872

METHOD OF MANUFACTURING ELECTRODES FOR BATTERIES

Filed Dec. 1, 1924  3 Sheets-Sheet 1

Inventor.
David Pepper.
by Francis Chambers
his Attorney.

Dec. 27, 1927. 1,653,872
D. PEPPER
METHOD OF MANUFACTURING ELECTRODES FOR BATTERIES
Filed Dec. 1, 1924 3 Sheets-Sheet 2
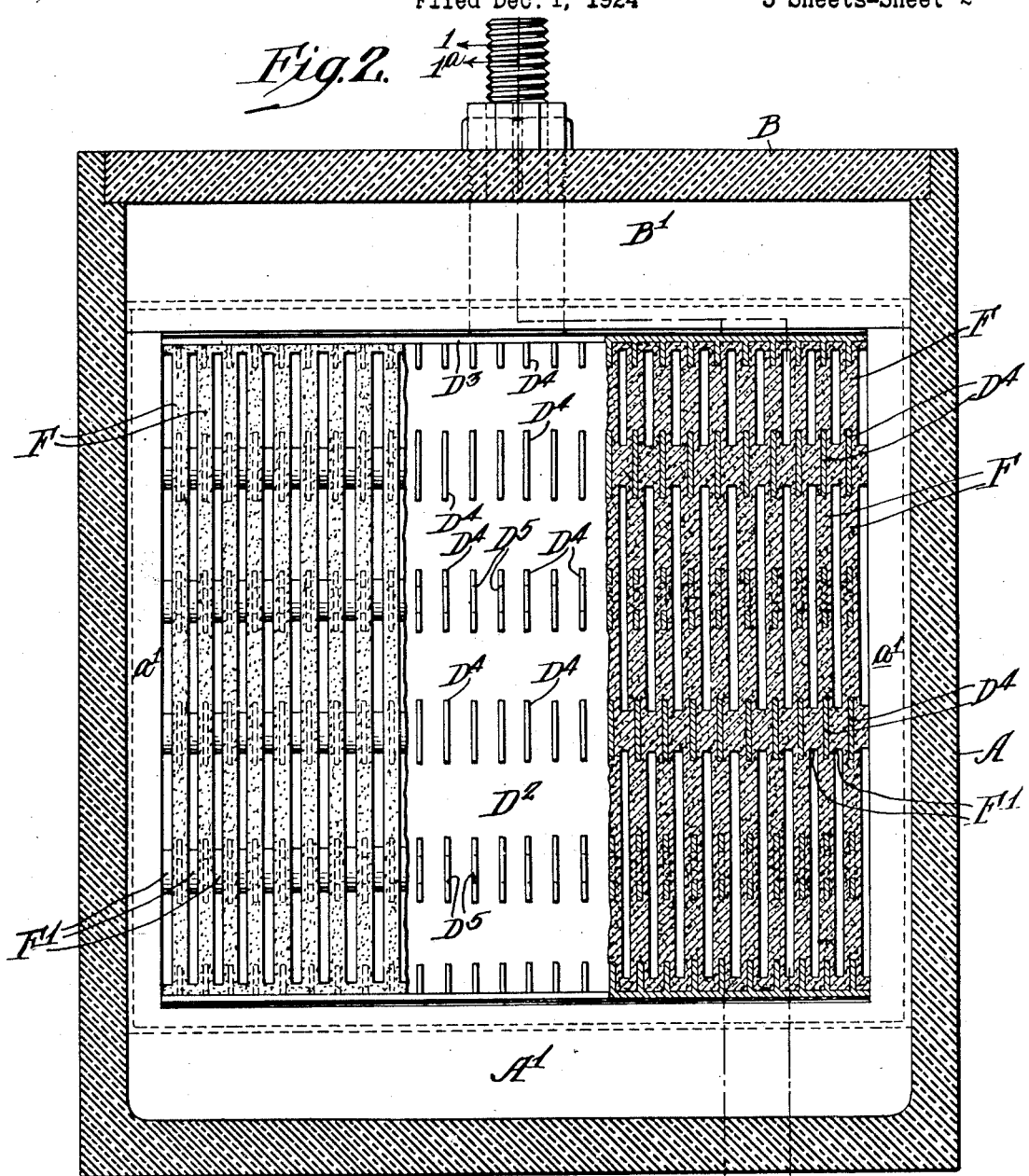
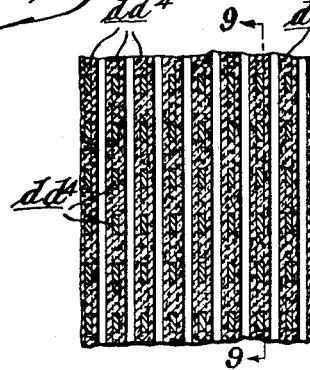
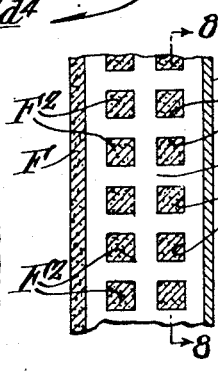
Inventor
David Pepper
by Francis Chandler
his Attorney Dec. 27, 1927.  
D. PEPPER  
1,653,872  
METHOD OF MANUFACTURING ELECTRODES FOR BATTERIES  
Filed Dec. 1, 1924  3 Sheets-Sheet 3
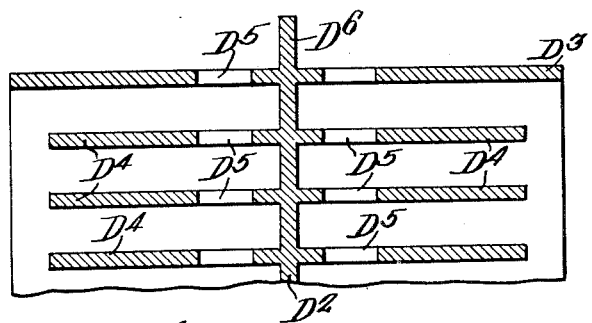
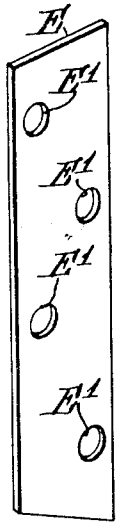
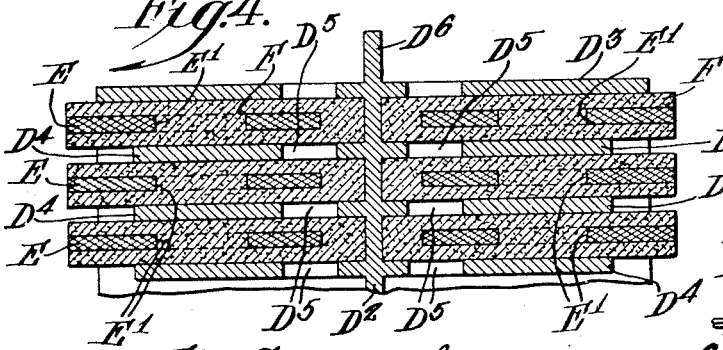
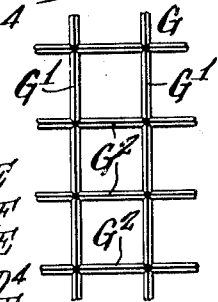
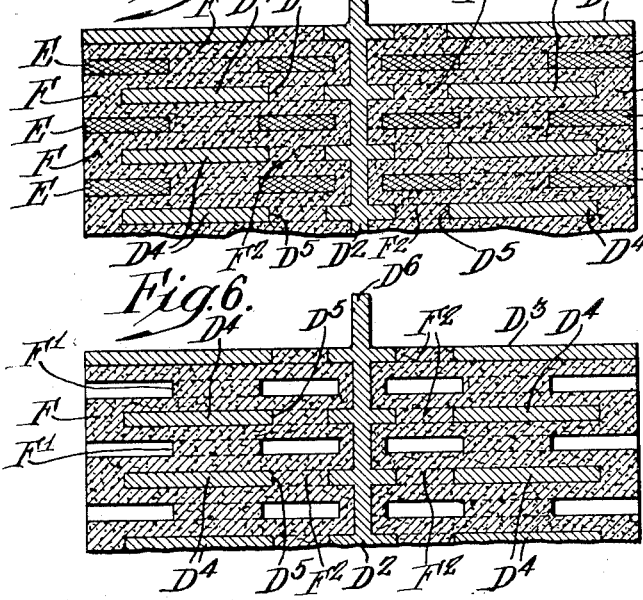
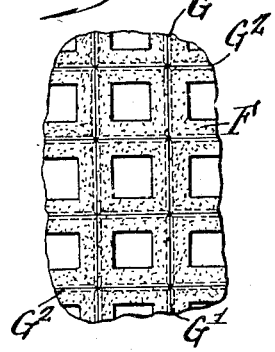
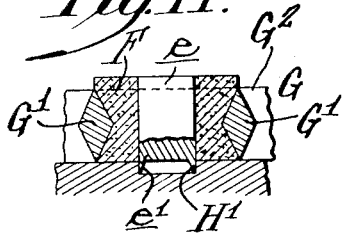
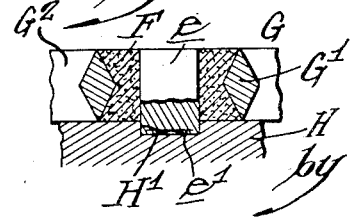
Inventor  
David Pepper  
by Francis D. Chandler  
his Attorney Patented Dec. 27, 1927.

1,653,872

UNITED STATES PATENT OFFICE.

DAVID PEPPER, OF PHILADELPHIA, PENNSYLVANIA.

METHOD OF MANUFACTURING ELECTRODES FOR BATTERIES.

Application filed December 1, 1924. Serial No. 753,371.

My invention relates to the manufacture of electrodes for batteries. It has for its object to provide a method by which active material (by this term I mean to include material which will become active on further treatment as well as material which can be described as active in the condition in which it is applied) can be conveniently applied to the supporting walls of a conducting grid, my new method being of such a nature as to make it feasible to use supports or grids or forms which could not be commercially used if they were pasted by ordinary methods.

Broadly speaking, my method consists in compacting the active material while in a plastic condition between the supporting walls of the grid and cores of readily fusible material and, after the plastic material has set, removing the cores by fusion. My new method is especially valuable as used in connection with a grid formed with a multiple series of parallel ribs extending from a conducting support and in applying my invention to the pasting of such a grid I preferably provide plates of fusible material considerably thinner than the space between adjoining ribs, coating such plates with active material extending over their sides and inner edges, and then force the coated plates into the spaces between the parallel ribs so as to force the paste of active material against the walls of the spaces and compact it in the plates where it is to remain, and having thus coated the plates I then melt out the fusible plates, leaving the active material in place and providing for the entry of the electrolyte between the grid ribs.

In order to press the active material in position I find it feasible to form the fusible plates with transverse apertures, through which the active material extends, forming studs which serve to hold the active material against the supporting ribs and I also find it feasible to further anchor the active material in position on the supported ribs by forming transverse apertures in the ribs which are filled by the active material.

My invention will be best understood as explained in connection with the drawings in which Figure 1 is a sectional elevation which on the right hand side is taken on the section line 1—1 of Fig. 2, and on the left hand side is taken on the section line 1ª—1ª of Fig. 2.

Figure 2 is a transverse sectional elevation which on the left hand is taken through the section line 2—2 of Fig. 1, on the right hand through section line 2ª—2ª of Fig. 1, while in the middle the active material is omitted and the apertured parallel rows of ribs shown without coating of active material.

Figure 3 is a cross section through the double electrode shown in Fig. 1, taken as on the section line 3—3, but with the active material omitted.

Figures 4 and 5, are similar sectional views showing the way in which the fusible plates are used to apply the active material to the supporting walls of the grid.

Figure 6 is a cross section on the line 6—6, of Fig. 1, with the active material in place.

Figure 8 is a sectional view on the line 8—8 of Fig. 9, and

Figure 9, a sectional view on the line 9—9 of Fig. 8, these figures showing their modified form of an apertured rib.

Figure 10 is a perspective view of one of the fusible plates shown in Figures 4 and 5.

Figures 11 and 12 are sectional views illustrating the application of my invention to a different form of supporting grid, Figure 13, showing the general form of the grid, and Figure 14, the grid after the active material is applied to it.

Figure 1:
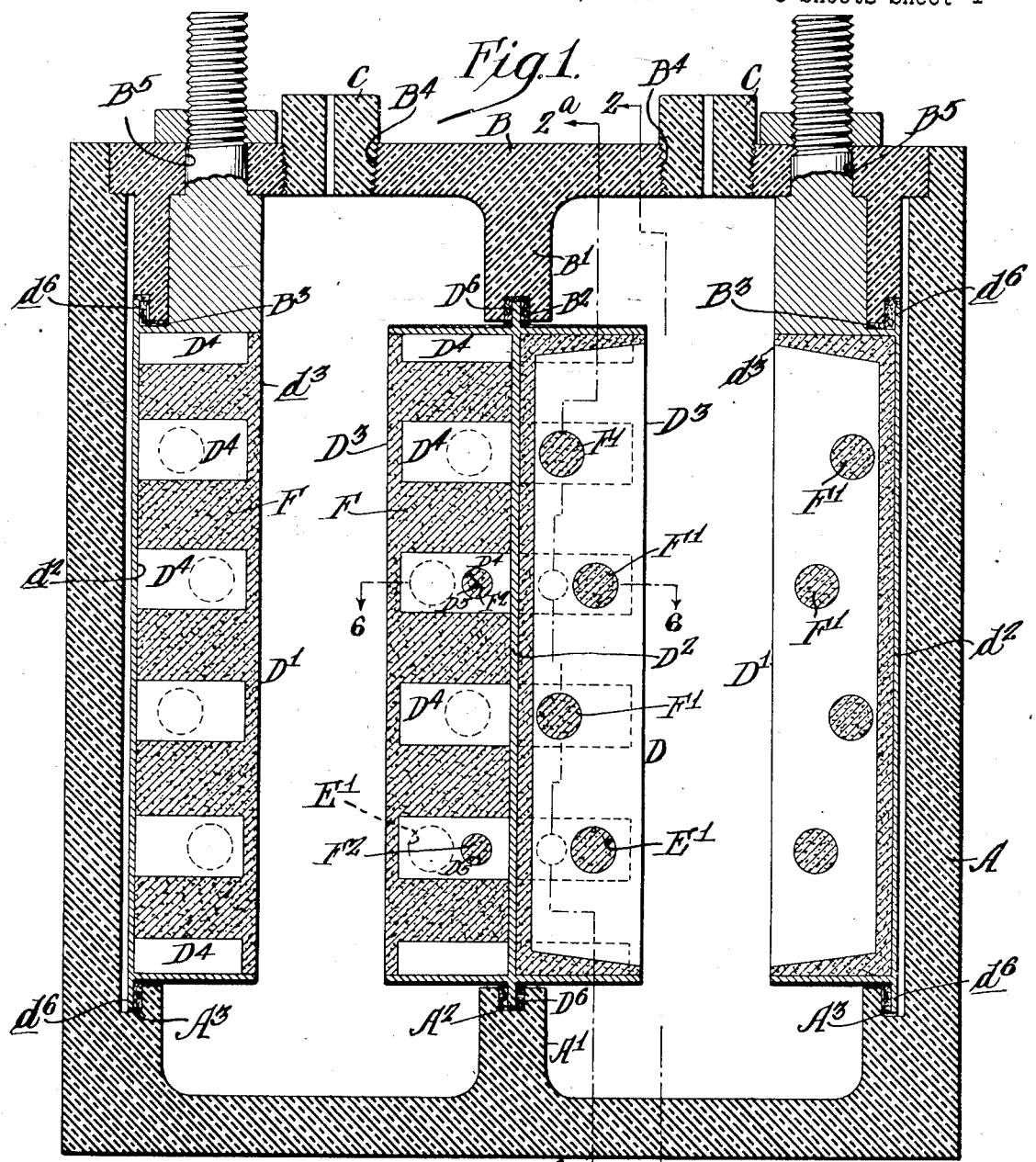
Figure 7:
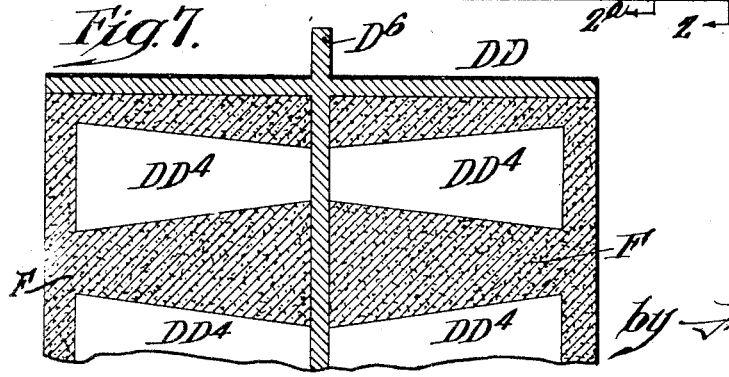
Figure 7 is a fragmentary sectional view generally similar to that shown in Fig. 1, but showing a change in the form of the apertures through the ribs.

A, Figs. 1 and 2, indicates the casing of the battery which is shown as formed with a centrally located electrode supporting rib A¹ grooved as indicated at A² and with grooves as indicated at A³, A³ for supporting the electrodes located at the side of the casing. B indicates the top or lid of the casing formed with a central rib B¹ grooved as indicated at B² and with lateral grooves as indicated at B³, B³. The lid is shown as provided with threaded perforations B⁴ through which electrolyte can be charged into the battery and which, as shown, are partly closed by perforated plugs C, C. The lid is also provided with perforations B⁵, B⁵, through which extensions of the conducting grid extend as shown. D is the centrally located electrode and D¹, D¹, the laterally located electrodes. The central electrode is made up of a centrally located plate D² through each side of which extend box-like casings indicated at D³, D³ and a series of parallel ribs D⁴ which can be interrupted or apertured through, as shown, for instance, in Fig. 2 or in Fig. 9, or, when constructed as shown in Fig. 2, apertures may be formed through the rib portions, as indicated at D⁵. The electrode is also supplied with ribs D⁶ which extend into the grooves formed in the ribs A¹ and B¹ and into similar grooves in the walls of the casings, as indicated at a¹. The lateral electrodes D¹ are similarly formed to the double electrode D except that the plate d² forms the back of the electrode and the supporting lug d⁶ extends into grooves in the end walls of the casing, as shown in the modification illustrated in Fig. 7. The apertures between the sections of the ribs, indicated here at DD⁴ are made angular instead of straight, and in the modification illustrated in Figs. 8 and 9, the ribs here indicated at dd⁴ are continuous but formed with apertures extending through them, as indicated at dd⁵. The back plate is in this figure indicated at dd². In the modification illustrated in Figs. 11, 12, 13, and 14, the grid indicated at G is made up of cross bars G¹ and G² of diamond shaped section.

E, shown in perspective in Fig. 10 and illustrated also in Figs. 4 and 5, is a plate of fusible material, preferably fusible metal, formed with apertures extending through it, as indicated at E¹, E¹, etc. F indicates the active material with which the supporting ribs of the grid are covered. H, Figs. 11 and 12, illustrates a table or support formed with recesses indicated at H¹ and used as will be hereafter described. e, Figs. 11 and 12, indicates a plug of fusible material formed as shown in Fig. 11, with a light rib e¹ at its bottom.

In applying my method to grids or conducting supports such as are shown in Figs. 1 to 6, inclusive, I coat the fusible metal plate E with a paste of active material indicated at F, the active material extending over the sides and inner edge of the plate, as shown in Fig. 5, and I then insert the coated plates into the spaces between the parallel ribs D⁴, as shown in Fig. 4, and then press the plates inward to the position, for instance, shown in Fig. 5, as a result of which the paste of active material is compacted against the walls of the rib and forced through the apertures formed in the ribs, as shown at F² while, at the same time, the paste of active material extends through the apertures E¹ in the fusible plate, forming studs F¹ which connect the layers of active material on the opposite sides of the fusible plate. After the active material has been sufficiently set I subject the plates to sufficient heat to melt out the fusible plates E, as a result of which the electrode is formed, as illustrated in Fig. 6.

When working with a grid, such as is shown in Figs. 11 to 14, I find it convenient to place the grid on the support H, with the apertures H¹ located in the center of the walls of the grid. I then place a fusible core, such as indicated at e with its ribs e¹ extending into the aperture H¹. I then charge a paste of active material F into the spaces between the core and the walls of the grid as shown in Fig. 11, then apply pressure to the fusible cores, pressing them down and collapsing the ribs e¹, as shown in Fig. 12, with the result of thoroughly compacting the paste against the walls of the grid, after which heat is applied to melt out the fusible core.

Having now described my invention, what I claim as new and desire to secure by Letters Patent, is:

1. In the manufacture of electrodes for batteries the method of pasting the grid of the plate with active material which consists in compacting the paste of active material while in a plastic condition between the supporting walls of the grid and cores of readily fusible material and, after the paste has set heating the electrode to a point at which the cores will fuse and flow, removing the cores by fusion.

2. In the manufacture of electrodes for batteries having a conducting support for active material comprising multiple rows of parallel ribs the method of pasting the support with active material which consists in providing plates of readily fusible material, applying to said fusible plates a coating of active material in plastic condition, forcing the coated plates between the parallel rows of ribs to compact the active material against the face of the ribs and removing the fusible plates by heating the electrode to a point at which the fusible plates will fuse.

3. In the manufacture of electrodes for batteries the method of applying the active material to the supporting grid and bracing said active material in position upon the supporting walls of the grid which consists in compacting a plastic paste of active material between the supporting walls of the grid and a transversely apertured core of readily fusible material so as to form layers of active material connected by studs extending through the apertures of the fusible plates and, after the paste has set, removing the cores by heating the electrode to a point at which the fusible plates will fuse.

4. In the manufacture of electrodes for batteries having a conducting support for active material comprising multiple rows of parallel ribs formed with apertures extending through them, the method of pasting the support with active material and anchoring such active material to the ribs, which consists in providing plates of readily fusible material, applying to said fusible plates a coating of active material in plastic condition, forcing the coated plates between the parallel rows of ribs to compact the active material against the faces of the ribs and force it through the apertures therein and removing the fusible plates by heating the electrode to a point at which the fusible plates will fuse.

DAVID PEPPER.